(12) United States Patent
Lundstrom

(10) Patent No.: US 10,486,234 B2
(45) Date of Patent: Nov. 26, 2019

(54) NOZZLE AND A TUNDISH ARRANGEMENT FOR THE GRANULATION OF MOLTEN MATERIAL

(71) Applicant: UVAN HOLDING AB, Taby (SE)

(72) Inventor: Per-Ake Lundstrom, Taby (SE)

(73) Assignee: UVAN HOLDING AB, Taby (SE)

( * ) Notice: Subject to any disclaimer, the term of this patent is extended or adjusted under 35 U.S.C. 154(b) by 171 days.

(21) Appl. No.: 15/550,174

(22) PCT Filed: Feb. 12, 2016

(86) PCT No.: PCT/SE2016/050108
§ 371 (c)(1),
(2) Date: Aug. 10, 2017

(87) PCT Pub. No.: WO2016/133445
PCT Pub. Date: Aug. 25, 2016

(65) Prior Publication Data
US 2018/0029133 A1 Feb. 1, 2018

(30) Foreign Application Priority Data
Feb. 16, 2015 (EP) .................................... 15155251

(51) Int. Cl.
B22F 9/08 (2006.01)
C21B 3/08 (2006.01)
(Continued)

(52) U.S. Cl.
CPC .......... B22F 9/082 (2013.01); B29C 48/0022 (2019.02); B29C 48/04 (2019.02);
(Continued)

(58) Field of Classification Search
CPC ...................... B22F 9/082; B22F 2009/0812
See application file for complete search history.

(56) References Cited

U.S. PATENT DOCUMENTS 3,888,956 A 6/1975 Klint
3,995,682 A 12/1976 Fekete et al.
(Continued)

FOREIGN PATENT DOCUMENTS

CN 1068283 1/1993
DE 19739747 3/1999
(Continued)

OTHER PUBLICATIONS

Communication Pursuant to Srticle 94(3) EPC, dated Jan. 3, 2019, for European Patent Application No. 16752731.6.
(Continued)

Primary Examiner — Scott R Kastler
(74) Attorney, Agent, or Firm — Karceski IP Law, PLLC

(57) ABSTRACT

A nozzle, a tundish arrangement used for the production of granulated material, and a method and apparatus for the production of a granulated material with an improved size distribution are provided. The grain size and grain size distribution is controlled by a nozzle having a specific design. The nozzle comprises an upper inlet opening, sidewalls forming a channel, a bottom and at least one outlet opening or at least one row of outlet openings at the lower end of the channel. The outlet opening(s) in the channel have a size of at least 5 mm in the smallest dimension. A cross sectional area of the channel at the inlet $A_C$ is at least 3 times bigger than the total area of the outlet openings $A_T$.

12 Claims, 7 Drawing Sheets

(51) Int. Cl.
  *B29C 48/30* (2019.01)
  *B29C 48/92* (2019.01)
  *B29C 48/05* (2019.01)
  *B29C 48/04* (2019.01)
  *B29C 48/00* (2019.01)
  *B29C 48/345* (2019.01)
  *B22F 9/10* (2006.01)

(52) U.S. Cl.
  CPC .............. *B29C 48/05* (2019.02); *B29C 48/30* (2019.02); *B29C 48/3001* (2019.02); *B29C 48/345* (2019.02); *B29C 48/92* (2019.02); *C21B 3/08* (2013.01); *B22F 9/10* (2013.01); *B22F 2009/088* (2013.01); *B22F 2009/0812* (2013.01); *B22F 2304/15* (2013.01); *B29C 2948/926* (2019.02); *B29C 2948/9259* (2019.02); *B29C 2948/92095* (2019.02); *B29C 2948/92104* (2019.02); *C21B 2400/024* (2018.08); *C21B 2400/032* (2018.08); *C21B 2400/052* (2018.08)

(56) References Cited

U.S. PATENT DOCUMENTS

| | | | |
|---|---|---|---|
| 4,192,673 | A | 3/1980 | Baba et al. |
| 4,402,884 | A | 9/1983 | Koike et al. |
| 4,977,950 | A | 12/1990 | Muench |
| 6,287,362 | B1 | 9/2001 | Levey et al. |
| 2018/0029133 | A1* | 2/2018 | Lundstrom ............. B29C 48/92 |

FOREIGN PATENT DOCUMENTS

| | | |
|---|---|---|
| EP | 0402665 A2 | 12/1990 |
| EP | 0522844 A2 | 1/1993 |
| EP | 1493517 A2 | 5/2005 |
| EP | 2845671 A1 | 3/2015 |
| GB | 981182 | 1/1965 |
| GB | 1529858 | 10/1978 |
| JP | S5171865 A | 6/1976 |
| JP | S5550407 A | 4/1980 |
| JP | S5763604 A | 4/1982 |
| JP | S58222177 A | 12/1983 |
| JP | H03285004 A | 12/1991 |
| JP | 2000073109 A | 3/2000 |
| JP | 2005023024 A | 1/2005 |
| JP | 2016456131 A | 11/2016 |
| KR | 20140087167 A | 7/2014 |
| RU | 2058853 C1 | 4/1996 |
| RU | 2232066 C1 | 7/2004 |
| SU | 1026969 | 7/1983 |
| SU | 1274851 A1 | 12/1986 |

OTHER PUBLICATIONS

Communication Pursuant to Srticle 94(3) EPC, dated Nov. 27, 2018, for European Patent Application No. 16752731.6.
Chinese Office Action dated Dec. 21, 2018, for Chinese Patent Application No. 201680010305.8.
International Search Report and Written Opinion dated Apr. 6, 2016, for International Patent Application No. PCT/SE2016/050108.
European Search Report dated Oct. 9, 2018, for European Patent Application No. 16752731.6.
Russian Office Action dated Apr. 29, 2019, for Russian Patent Application No. 2017127342/02(047206).
Search Report with Russian Office Action dated Apr. 29, 2019, for Russian Patent Application No. 2017127342/02 (047206).
Stepanenko A.V. i dr. Nepreryvnoe Formirovanie Metallicheskih Poroshkov I Granul. Minsk, Nauka I Tehnika, 1980, pp. 41-45 (Listed on Search Report as an "A" reference; no publication currently available).
Chinese Office Action dated Jul. 8, 2019, for Chinese Patent Application No. 201680010305.8.
Japanese Office Action dated Aug. 20, 2019, for Japanese Patent Application No. 2017-542917.
Stepanenko A.V. i dr. Nepreryvnoe Formirovanie Metallicheskih Poroshkov I Granul. Minsk, Nauka I Tehnika, 1980, pp. 41-45.

* cited by examiner

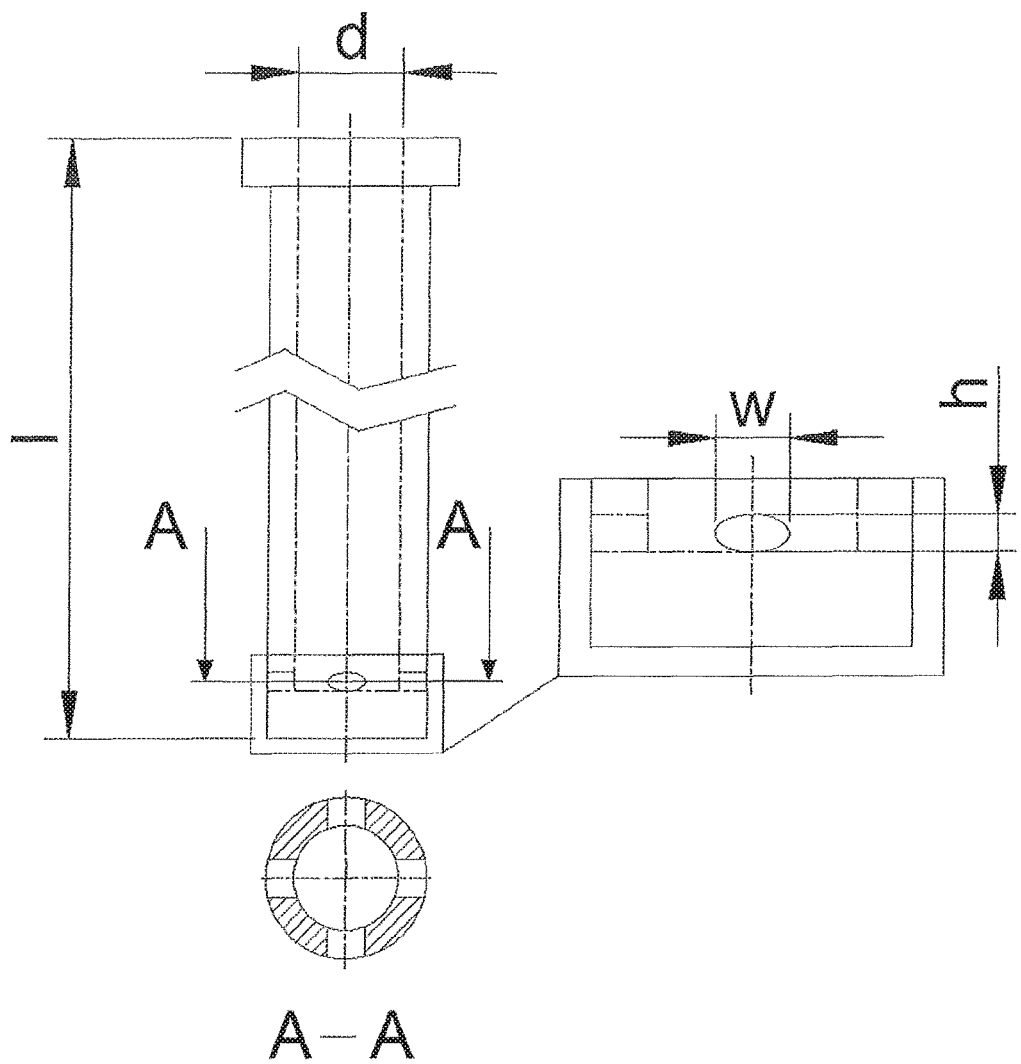
Figure 3. Pouring nozzle

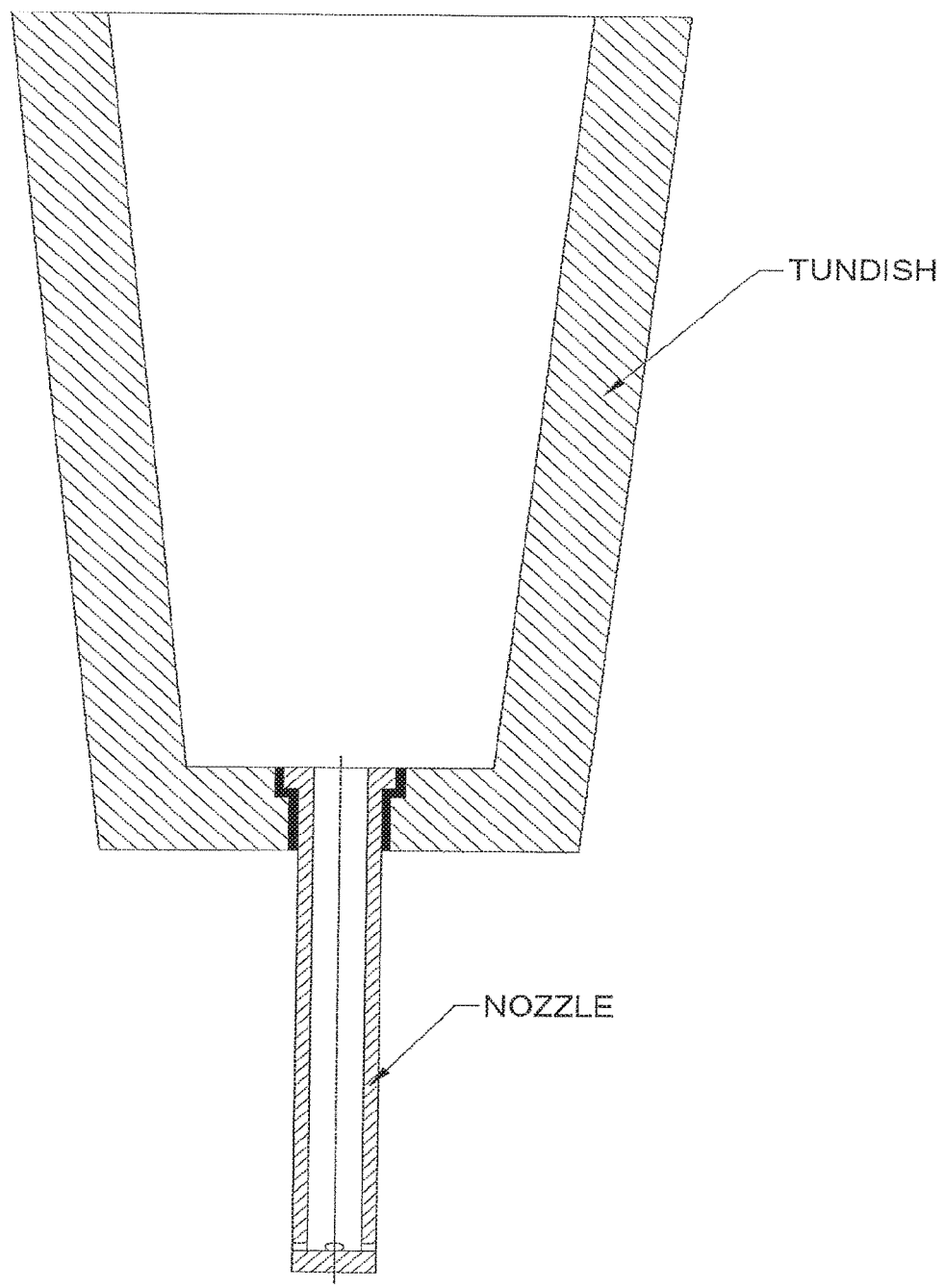
Figure 4. Tundish arrangement

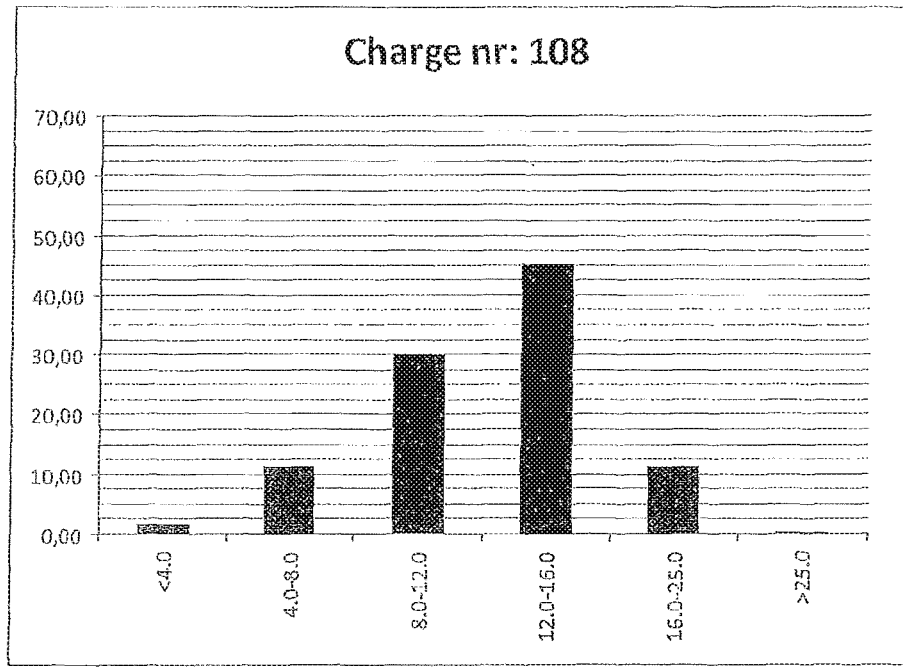
Fig 5    Example 1. Size distribution according to the invention.
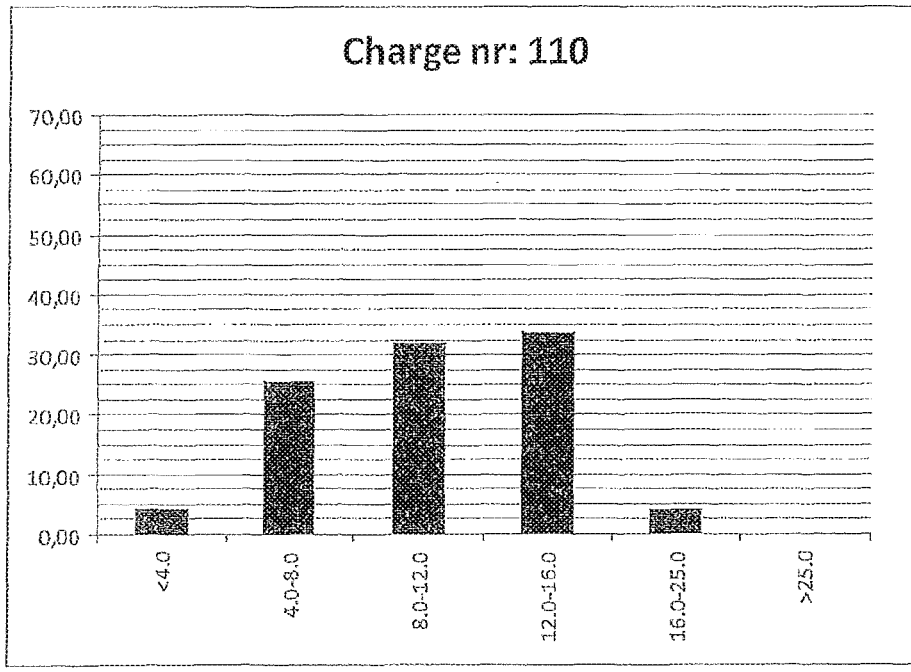
Fig 6    Example 1. Size distribution according to the prior art.

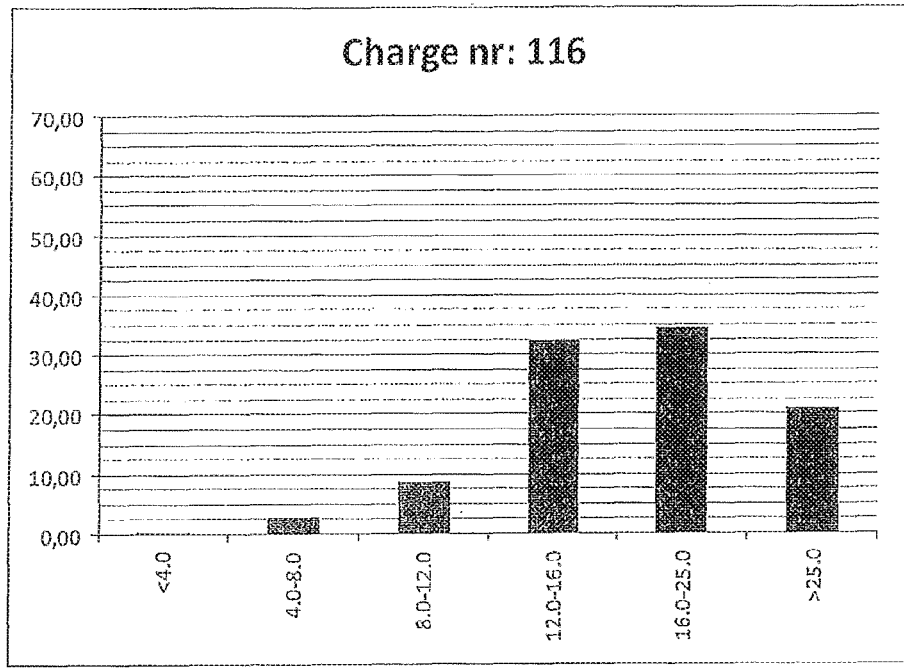
Fig 7  Example 2. Size distribution according to the invention.
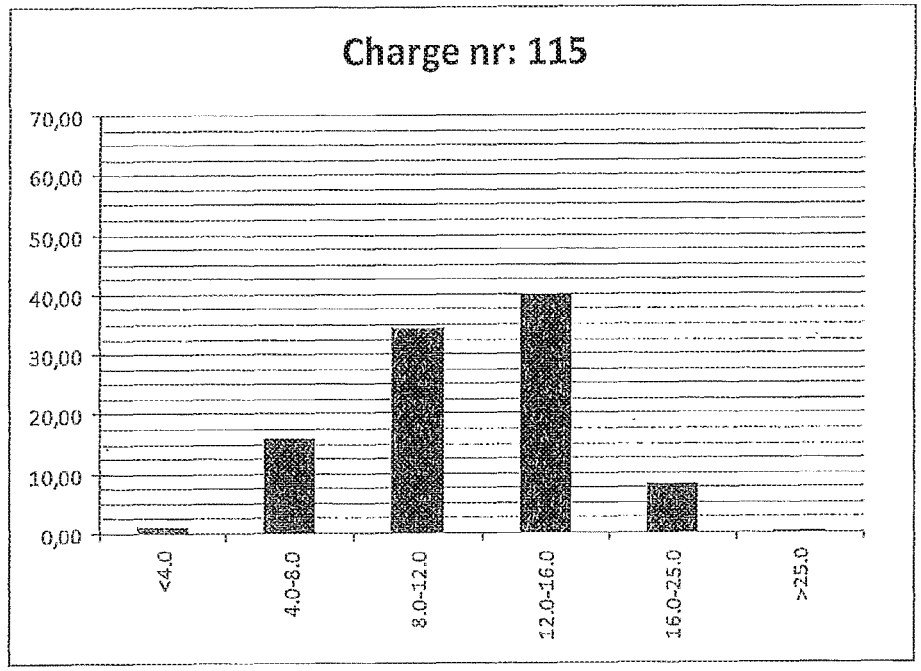
Fig. 8  Example 2. Size distribution according to the prior art.

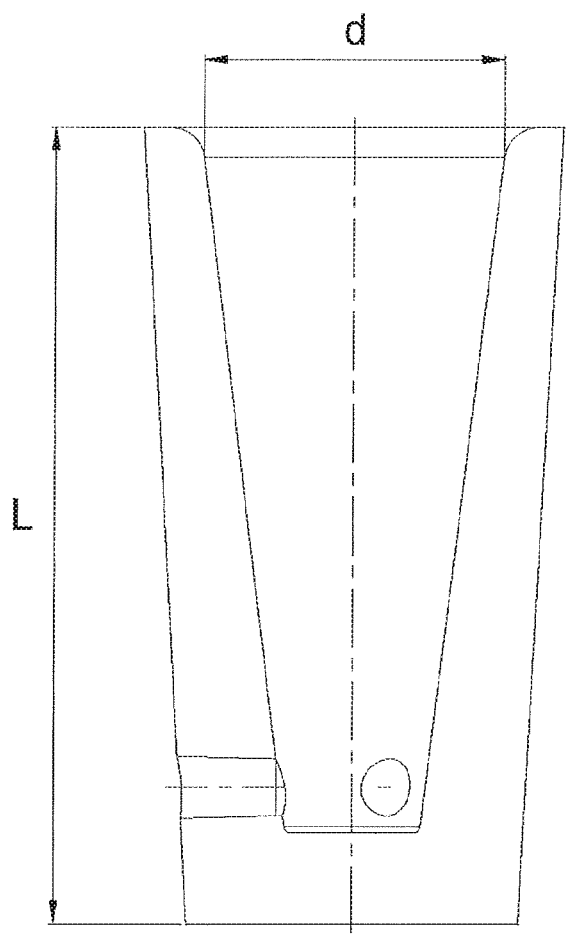
Fig. 9. Conical nozzle having three vertical outlet openings.

NOZZLE AND A TUNDISH ARRANGEMENT FOR THE GRANULATION OF MOLTEN MATERIAL

CROSS-REFERENCE TO RELATED APPLICATIONS

This is a National Stage Entry into the United States Patent and Trademark Office from International PCT Patent Application No. PCT/SE2016/050108, having an international filing date of Feb. 12, 2016, and which claims priority to European Patent Application No. 15155251.0, filed Feb. 16, 2015, the entire contents of both of which are incorporated herein by reference.

TECHNICAL FIELD

The invention relates to equipment used for the granulation of molten material.

BACKGROUND OF THE INVENTION

Metal granulation in water is a well-established method for rapid solidification of liquid metal into a medium sized product form. The Granshot® process has been developed for the direct production of ready to use material for the steel industry. The known apparatus is disclosed in FIG. 1. The molten metal is directed from a tundish to a refractory target, which is denoted spray head in FIG. 1. The metal strikes the target, split up and is radially distributed over the cooling water in the tank. The droplets solidify in the tank and are recovered from the bottom of the tank. The size of the granules depends on several factors such as melt composition and impact conditions. The main fraction obtained lies within the size range of 5-25 mm. However, the amount of fines, defined as granules having a maximum dimension of ≤8 mm may be as high as 20%. The principles of this method are disclosed in EP 402 665 and U.S. Pat. No. 3,888,956.

U.S. Pat. No. 4,402,884 discloses a method of granulating using a rotating disc. The main part of the granules obtained according to this method has a size of less than 10 mm.

Although the grain sizes obtained by the above mentioned method allow a rapid dissolution of the granular metal in a steel melt there is a drawback in that there are limited possibilities to adjust the mean grain size and the grain size distribution.

EP 522 844 discloses a method of producing metal granules by pouring a metal stream into a liquid cooling bath. U.S. Pat. No. 6,287,362 discloses a method of producing metal lumps having a characteristic dimension of 20-100 mm by introducing a molten metal stream into a stream of water. Drawbacks associated with these methods are long dissolution times for the coarse material and a wide particle size distribution.

SUMMARY OF THE INVENTION

The general objective of the present invention is to provide a nozzle and a tundish arrangement for the production of a granulated material having an improved size distribution.

Another object is to provide a method and an apparatus for making a granulated material having an improved size distribution. In particular, it should be possible to obtain granules having a low fraction of fines and at the same time a mean size resulting in a rapid dissolution in the melt. For the same reason it is necessary that coarse granules are completely avoided or that the amount of coarse granules are at least limited.

It is also an object to provide a material having a more narrow size distribution of the granules obtained.

These objects are achieved by the means of the invention as defined in the independent claims.

Further advantageous embodiments of the invention have been specified in the dependent claims.

According to the invention the granulation is performed with a nozzle or a tundish arrangement comprising said nozzle. The granulation of molten material results in a granulated material having a mean size in the range of 10-50 mm, wherein the amount of fines in the granulated material having a size of less than 8 mm is limited to 5%.

The nozzle comprises an upper inlet opening, sidewalls forming a channel, a bottom and at least one outlet opening or at least one row of outlet openings at the lower end of the sidewalls forming the channel, wherein the outlet opening or openings in the channel have a size of at least 5 mm in the smallest dimension and wherein the cross section area of the channel at the inlet ($A_C$) is at least 3 times bigger than the total area of the outlet openings ($A_T$).

BRIEF DESCRIPTION OF THE FIGURES

In the following, the invention will be described in more detail with reference to the preferred embodiments and the appended drawings.

FIG. 3 is a schematic drawing of a pouring nozzle according to the invention.

FIG. 4 is a schematic drawing of a tundish arrangement according to the invention.

FIG. 5 discloses the size distribution of the granules of the invention obtained in Example 1 wherein the ferronickel contained 32% Ni and 0.1% Si.

FIG. 6 discloses the size distribution of the granules of the comparative method wherein the ferronickel contained 32% Ni and 0.1% Si.

FIG. 7 discloses the size distribution of the granules of Example 1 wherein the ferronickel contained 32% Ni and 0.27% Si.

FIG. 8 discloses the size distribution of the granules of the comparative method wherein the ferronickel contained 32% Ni and 0.27% Si.

FIG. 9 is a schematic drawing of a tapered pouring nozzle according to the invention.

DETAILED DESCRIPTION OF THE INVENTION

The present invention will be described in detail with reference to the attached drawings.

Figure 2:
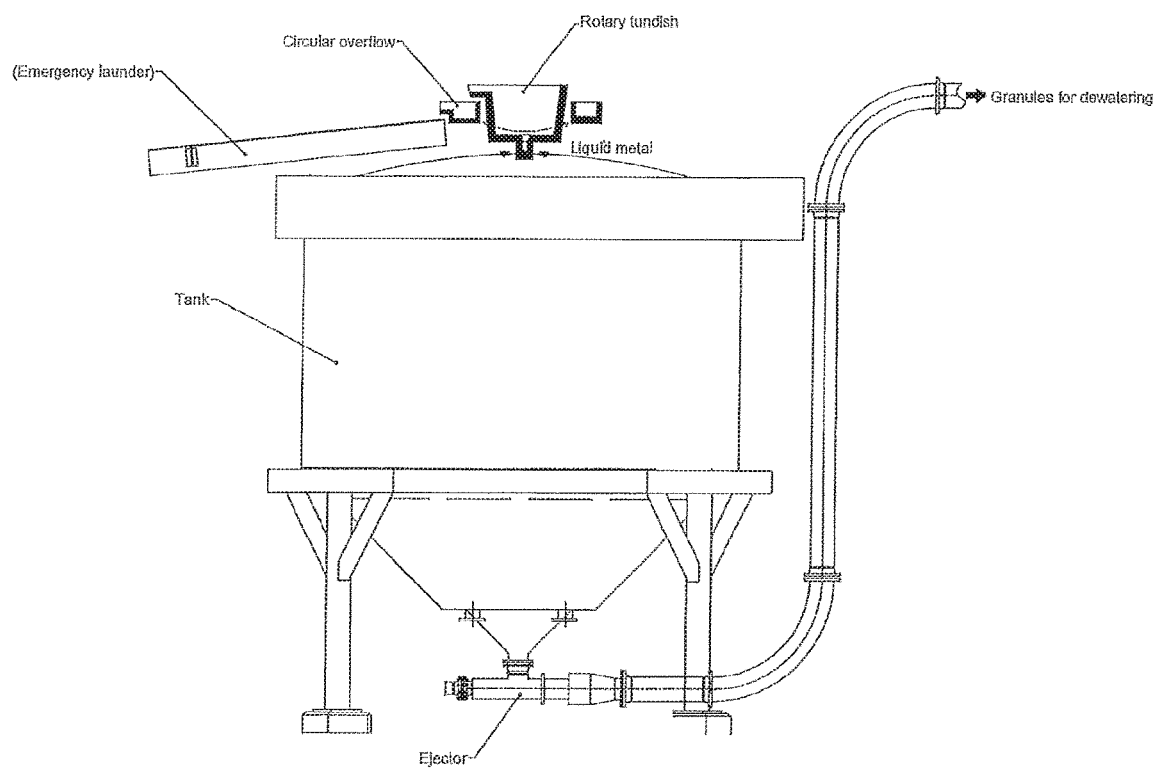
FIG. 2 is a schematic drawing of one embodiment of the present invention in which the pouring nozzle is attached to a rotating tundish.

The inventive nozzle and tundish arrangement can be used in an apparatus for the production of granulated material as shown in FIG. 2. The apparatus comprises a cooling tank containing a cooling fluid, means for feeding the liquid material to a rotatable tundish which is positioned above the cooling tank, a nozzle attached to the bottom of the rotatable tundish, the nozzle comprises an upper inlet opening, sidewalls forming a channel, a bottom and at least one outlet opening or at least one row of outlet openings at the lower end of the channel, wherein the outlet openings in the channel have a size of at least 5 mm in the smallest dimension and not more than 50 mm in its largest dimension and wherein the cross section area of the channel at the upper inlet ($A_C$) is at least 3 times bigger than the total area of the outlet openings ($A_T$); $A_C \geq 3\ A_T$. The smallest dimension of the outlet openings may be 5, 6, 7, 8, 9, 10, 11, 12, 13, 14, 15, 16, 17, 18 19 or 20 mm. The largest dimension may be restricted to 50, 45, 50, 40, 35, 30, 25, 20, 18 or 16 mm.

The nozzle is designed in order to optimize the flow conditions for granulation.

FIG. 3 discloses a nozzle according to the invention. The length (L) of the nozzle may be limited to 80 cm, preferably to ≤60 cm. Hence, the length may be restricted to 80, 70, 60, 55, 50, 45, 40, 35, 30, 25 or 20 cm. The vertical channel formed by the sidewalls may have any suitable form. It may have a polygonal cross section such as a square or be elliptic. However, for practical reasons the channel may have a general cylindrical form as shown in FIG. 3 with a diameter (d) in the range of 6 to 20 cm or 8 to 15 cm. Hence, the diameter may be 6, 7, 8, 9, 10, 11, 12, 13, 14 or 15 cm. The diameter of the vertical channel is much larger than the diameter of the outlets.

The cross sectional area of the channel at the inlet ($A_C$) is much larger than the total area of the outlets ($A_T$), wherein said total area is calculated from the size of the outlet openings on the inside of the sidewalls, because the outlet openings may be tapered. In order to optimize the flow conditions for granulation the ratio between the cross sectional area of the channel at the inlet and the total area of the outlets $A_C/A_T$ should be at least 3. Preferably, $A_C/A_T \geq 6$, $A_C/A_T \geq 12$, $A_C/A_T \geq 16$ or even $A_C/A_T \geq 20$.

The vertical channel formed by the sidewalls may have a larger cross sectional area at the inlet ($A_C$) than at the lower end. The vertical channel may be tapered or conical. The diameter at the inlet (d) is then larger than at the lower end of the channel. FIG. 9 discloses a tapered nozzle. In this case the outer contour of the nozzle is also conical, which can simplify the mounting of the nozzle, e.g. in a conical seat. The outlet openings at the lower end of the channel may be lightly tapered.

The nozzle may be provided with one or more of the following features.

Circular openings may be provided at the lower end of the sidewalls having a diameter of 10-50 mm, 10-30, 20-35 or 12-30 mm. The smallest diameter of said opening can be 10, 11, 12, 13, 14, 15, 16, 17, 18 19 or 20 mm. The largest diameter may be restricted to 50, 45, 40, 35, 32, 30, 28, 26, 24, 22, 20, 18 or 16 mm. The size and number of the openings depend on the design capacity i.e. tonnes per minute.

Elliptical openings may be provided having a height to width ratio (h/w) in the range of from 1:1.2 to 1:10. By adjusting the form of the opening, it is possible to adjust the form of the molten stream leaving the distributor. A wider opening results in a more film-like stream, thereby the size and shape of the granules may be influenced.

One row of openings and, preferably, not more than 4 openings may be provided in said single row. In order to get a good heat dissipation, the number of openings may be 2, 3 or 4. This design is the most simple to produce and the method is easy to control. It is therefore a preferred design.

Openings may be directed 0°-45° upwards, e.g., 5° or 25° upwards, or 15°-20° upwards. By this measure, it is possible to adjust the path and the time in the air before the stream hits the cooling liquid. Also, the spread of the molten stream over the cooling bath is influenced by the parabolic flight.

Openings may be directed 0°-45° downwards. By directing one or more streams downwards, it is possible to shorten the flight distance, reduce the risk of disintegration of the stream before it hits the cooling bath and influences the spread over the cooling bath.

Tapered openings may be provided.

FIG. 4 is a schematic drawing of a tundish arrangement according to the invention.

According to a preferred embodiment the tundish has a circular cross section and the pouring nozzle is centrally attached thereto. The pouring nozzle may have 4 circular openings each having a diameter of 10-30 mm, preferably 20-25 mm. The pouring nozzle may have 3 circular openings each having a diameter of 10-35 mm, preferably 22-28 mm. The pouring nozzle may have 2 circular openings each having a diameter of 10-40 mm, preferably 26-35 mm.

The tundish may be provided with a weighing system that automatically controls the level in the tundish in order to maintain a constant liquid head and thereby a constant flow rate through the pouring nozzle. Alternatively, the automatic control system may include optical or electromagnetic sensors.

The granulated material obtained with the inventive method has a narrow size distribution and typically a mean size in the range of 12-50 mm, preferably 16-30 mm and wherein the amount of fines having a size of less than 8 mm may be limited to ≤5% or even to ≤3%. The amount of fines having a size of less than 6 mm may be limited to ≤3% or even to ≤1%. The amount of fines having a size of less than 5 mm may be limited to ≤1%. The upper limit for the mean size may be 45 mm, 40 mm, 35 mm, 32 mm, 30 mm or 25 mm. The lower limit for the mean size may be 12 mm, 14 mm, 16 mm, 18 mm or 20 mm. The upper and lower limits may be freely combined. A ferronickel material comprising more than 2 wt. % C and/or wt. % Si may be disclaimed from this invention.

The amount of coarse granules having a size of >80 mm may be limited to 5% or even completely avoided.

The amount of coarse granules having a size of >60 mm may be limited to 10%, 8%, 5%, 3% or 1%.

The amount of coarse granules having a size of >40 mm may be limited to 15%, 10%, 5%, 3% or 1%.

Figure 1:
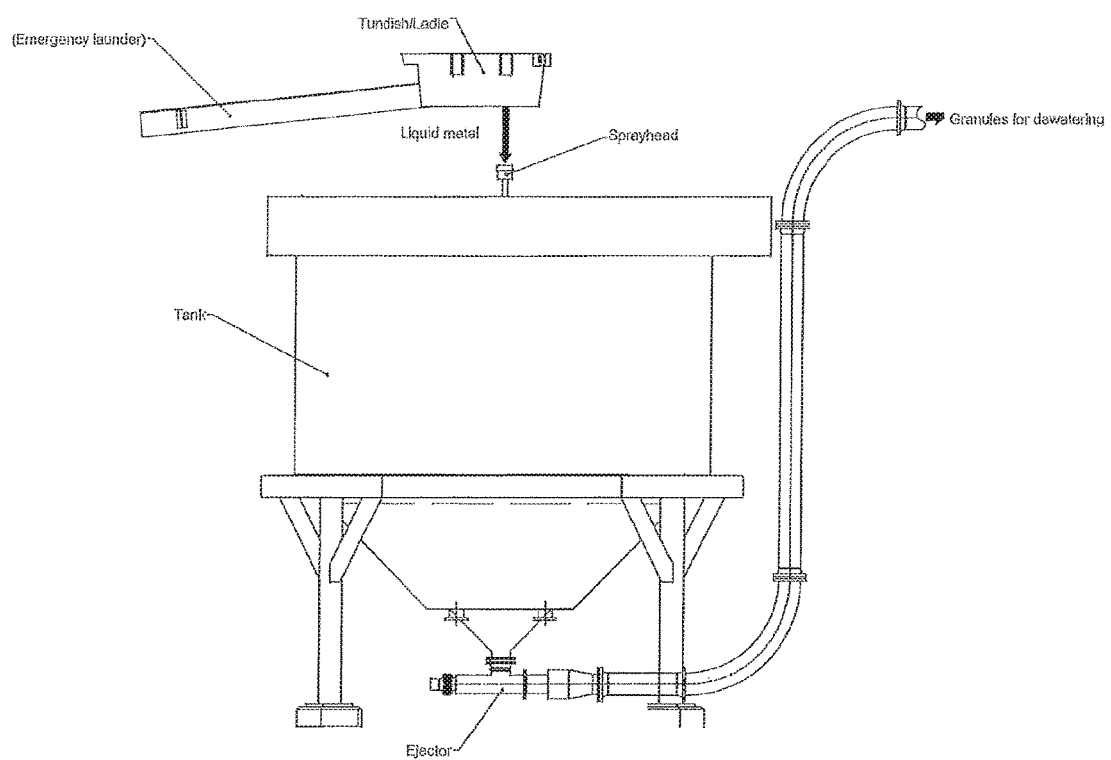
FIG. 1 is a schematic drawing of the apparatus used in the Granshot® process.

The amount of coarse granules having a size of >25 mm may be limited to 30%, 25%, 20%, 15%, 10%, 5%, 3% or, as shown in FIG. 1, to 1%.

The limitations with respect to the amount of fines and coarse granules are expressed as % of the total weight.

The invention is not to be seen as limited by the embodiments described above, but can be varied within the scope of the claims, as will be understood by the person skilled in the art.

EXAMPLES

In the following results obtained according to the invention are compared to results obtained with the known apparatus having a flat spray head. In all examples ferronickel was melted in an induction furnace and supplied to the tundish by use of a tapping spout. Tapping temperature was 1650° C. The melt level in the tundish was manually controlled to be 300-400 mm. The nozzle diameter in the tundish was 72 mm. After completed granulation the granules were removed from the tank, dried, weighted and subjected to screening. Size classes used were <4 mm, 4-8 mm, 8-12 mm, 12-16 mm, 16-25 mm and >25 mm. The results are given in % of the total weight.

Example 1

In this example the ferronickel contained 32% Ni and 0.1% Si.

The nozzle according to the invention had four holes in one single row. The four openings had a total opening area ($A_T$) of 346 mm2, thus $A_C \geq 10 A_T$.

A rotation speed of 3 rpm was used in order to secure an uniform heat dissipation.

The size distribution of the granules obtained according to the invention is disclosed in FIG. 5 (Charge Nr. 108).

The size distribution of the granules obtained with a conventional flat spray head is shown in FIG. 6 (Charge Nr. 110).

It is evident that the inventive apparatus resulted in an improved size distribution in that the amount of fines was reduced, the mean size was increased and the size distribution was improved.

Example 2

In this example the effect of an increased content of Si on the size distribution was examined.

The ferronickel contained 32% Ni and 0.27% Si. The granulation conditions were the same as for Example 1.

The size distribution of the granules obtained according to the invention is disclosed in FIG. 7 (Charge Nr. 116).

The size distribution of the granules obtained with a conventional flat spray head is shown in FIG. 8 (Charge Nr. 115).

An improved size distribution was achieved in both cases. The result for the conventional spray head was as expected, since it is known that Si has a positive influence on the size distribution. A comparison between Charge Nr. 115 and Charge Nr. 110 reveals that the increased Si content resulted in less fines and an improved size distribution.

However, the increased content of Si turned out to have a remarkable effect on the size distribution obtained with inventive apparatus. A comparison of Charge Nr. 116 and Charge Nr. 115 reveals that the amount of fines was virtually eliminated and the mean size of the granules was very much increased.

Example 3

In this experiment the generation of fines during the granulation of a commercial ferronickel grade having nominal content of 32% Ni and <0.5% Si. Nozzles of the type disclosed in FIG. 9 were used. The inner diameter (d) was 138 mm and the length (L) of the nozzle was 350 mm for all charges. The diameter of the outlet openings for the nozzle having three holes was 25 mm. The diameter of the outlet openings for the nozzle having four holes was 22 mm.

The results are given in the Table 1 below.

TABLE 1

Result from granulation of commercial FeNi.

| Charge No. | 1 | 2 | 3 |
|---|---|---|---|
| Melt. Temp. (° C.) | 1643 | 1650 | 1641 |
| Nozzle outlets | 3 | 3 | 4 |
| Rotation (RPM) | 4 | 4 | 4 |
| Tons granulated | 48 | 18 | 13 |

TABLE 1-continued

Result from granulation of commercial FeNi.

| Charge No. | 1 | 2 | 3 |
|---|---|---|---|
| $A_C/A_T$ | 9.9 | 9.9 | 9.6 |
| Fines, % < 6 mm | 3.00 | 2.05 | 1.85 |

The cross section area of the channel at the inlet ($A_C$) was nearly 10 times bigger than the total area of the outlet openings ($A_T$) for all charges. The granules obtained had a low fraction of fines having a size of less than 6 mm. In fact, not more than 3 wt. % fines were generated for any of these charges.

INDUSTRIAL APPLICABILITY

The invention is particular suited for application in the ferroalloy-, iron- and steel-industries.

The invention claimed is:
1. A nozzle for the granulation of molten material, for obtaining a granulated material having a mean size in a range of 10-50 mm, wherein an amount of fines in the granulated material with a size of less than 8 mm is limited to 5%, the nozzle comprising:
an inlet defining an inlet opening,
a bottom,
sidewalls forming a channel from the inlet to the bottom,
at least one row of no more than 4 outlet openings at a lower end of the sidewalls,
wherein each outlet opening of the 4 outlet openings has a diameter of 10-35 mm,
wherein $A_C \geq 6 A_T$, with
$A_C$ being a cross sectional area of the channel at the inlet opening, and
$A_T$ being a total area of the 4 outlet openings, and
wherein the granulated material is selected from a group comprising iron, pig iron, steel, and ferroalloy.

2. The nozzle according to claim 1, fulfilling at least one requirement selected from a group, comprising:
a length L of the nozzle is ≤80 cm,
the length L of the nozzle is ≤60 cm,
the channel is straight and has a circular cross section with a diameter of 80-200 mm,
the channel is tapered and has a circular cross section at the inlet with a diameter of 80-200 mm,
$A_C \geq 10 A_T$, and
$A_C \geq 15 A_T$.

3. A tundish for the production of the granulated material comprising the nozzle as defined in claim 1.

4. The tundish according to claim 3, further comprising a rotator attached thereto.

5. The tundish according to claim 4, wherein the tundish has a circular cross section and the nozzle is centrally attached thereto.

6. An apparatus for producing the granulated material having a mean size of at least 5 mm, the apparatus comprising:
a cooling tank for containing a cooling fluid,
a tundish comprising the nozzle according to claim 1, and
a feeder for feeding the molten material to the tundish,
wherein the tundish is positioned above the cooling tank.

7. The apparatus according to claim 6, further comprising at least one feature selected from a group comprising:
a circulator for circulating the cooling fluid in the cooling tank in a same direction with respect to the circulator, a circulator for circulating the cooling fluid in the cooling tank in an opposite direction with respect to the circulator, a height adjuster for adjusting the height of the nozzle in relation to an upper level of the cooling fluid in the cooling tank, a material remover for removing the granulated material from the cooling tank, a controller for controlling rotation of the tundish within a range of 1-50 rpm, a regulator for regulating the flow of the molten material from the feeder to a distributor, an intermediate receptor for supplying the molten material to the tundish, a chute for supplying the molten material to the tundish, and a refractory safety plate positioned below the nozzle, wherein the refractory safety plate spreads a stream of the molten material over a surface of the cooling fluid in case of a nozzle breakage.

8. A method of producing a granulated material, comprising:
- a) providing the apparatus according to claim 6,
- b) rotating the tundish at a speed of 1-50 rpm,
- c) feeding the molten material to the tundish,
- d) distributing at least one stream of the molten material over the cooling fluid in the cooling tank,
- e) disintegrating the molten material at least one of above and within the cooling fluid, and
- f) forming at least partly solidified granules of the granulated material, and
- g) recovering the granulated material from a bottom of the cooling tank.

9. The method of producing the granulated material according to claim 8, further comprising at least one feature selected from a group comprising:

using water with additions as the cooling fluid,
using water without additions as the cooling fluid,
rotating the tundish at a speed of 1-10 rpm,
feeding the molten material at a rate of 0.5-10 t/min
circulating the cooling fluid in the cooling tank in a same direction with respect to a rotator,
circulating the cooling fluid in the cooling tank in an opposite direction with respect to the rotator,
adjusting a height between the cooling fluid in the cooling tank to openings in a rotating distributor to be 0.1-1.5 m,
controlling a melt level in the tundish by controlling a flow from a feeder for the molten material to the rotating distributor,
controlling the melt level in the rotating distributor by controlling the flow from the feeder for the molten material to the rotating distributor,
controlling a rate of granulation by controlling a level of the molten material in at least one of the tundish and the rotating distributor,
recovering solidified granules dischargeable from a lower end of the cooling tank using a water and an air ejector, and
controlling the rate of granulation by controlling the level of at least one of a liquid slag and the molten metal in at least one of the tundish and the rotating distributor.

10. The nozzle according to claim 1, wherein each outlet opening of the 4 outlet openings is elliptically shaped, having a height to width ratio (h/w) in a range from 1:1.2 to 1:10.

11. The nozzle according to claim 1, wherein each outlet opening of the 4 outlet openings is directed 0°-45° upwards.

12. The nozzle according to claim 1, wherein the outlet opening of the 4 outlet openings is directed 0°-45° downwards.

* * * * *